INVENTORS.
EARL W. CHRISTEN
JAMES FRANKLIN SEELEY
GERALD V. KINGSLEY
BY
Brown, Critchlow, Flick & Peckham
ATTORNEYS.

3,305,918
METHOD OF PRODUCING COMPOSITE CAST-FORGED ALUMINUM PISTON WITH BONDED FERROUS RING CARRIER
Earl W. Christen, Toledo, Ohio, James F. Seeley, Royal Oak, Mich., and Gerald V. Kingsley, deceased, late of Detroit, Mich., by Mildred W. Kingsley, administratrix, Detroit, Mich., assignors, by mesne assignments, to Universal American Corporation, New York, N.Y., a corporation of Delaware
Original application Mar. 19, 1963, Ser. No. 266,458, now Patent No. 3,183,796, dated May 18, 1965. Divided and this application Aug. 4, 1964, Ser. No. 393,467
2 Claims. (Cl. 29—156.5)

This application is a division of Serial No. 266,458, filed March 19, 1963, now Patent No. 3,183,796, granted May 18, 1965.

The present invention relates to a composite cast-forged aluminum piston having a metallurgically bonded ferrous ring-carrier. These pistons are of particular advantage for use in heavy-duty internal combustion engines.

It has been known that forged aluminum has advantages over cast aluminum for certain parts of pistons, on account of its greater soundness, higher mechanical and physical properties, and better fatigue resistance. For these reasons it is advantageous to use forged aluminum for the piston skirt, including the piston pin bosses.

On the other hand, it is advantageous to use cast aluminum in the piston head because the head is exposed to the heat and flame of combustion, and cast aluminum has been found to be less susceptible to cratering and burning than forged aluminum.

It has also been found advantageous in heavy-duty pistons, such as those used in diesel engines, trucks, etc., to provide the aluminum piston with a cast-in ring or band which carries the piston ring or rings.

The present invention provides an aluminum piston that has all three of these advantages, namely: a cast head; a cast-in, metallurgically-bonded ferrous ring carrier; and a forged skirt.

These, and other advantages and objects of the invention will become clear from the following detailed explanation of the invention.

Figures 1, 2:
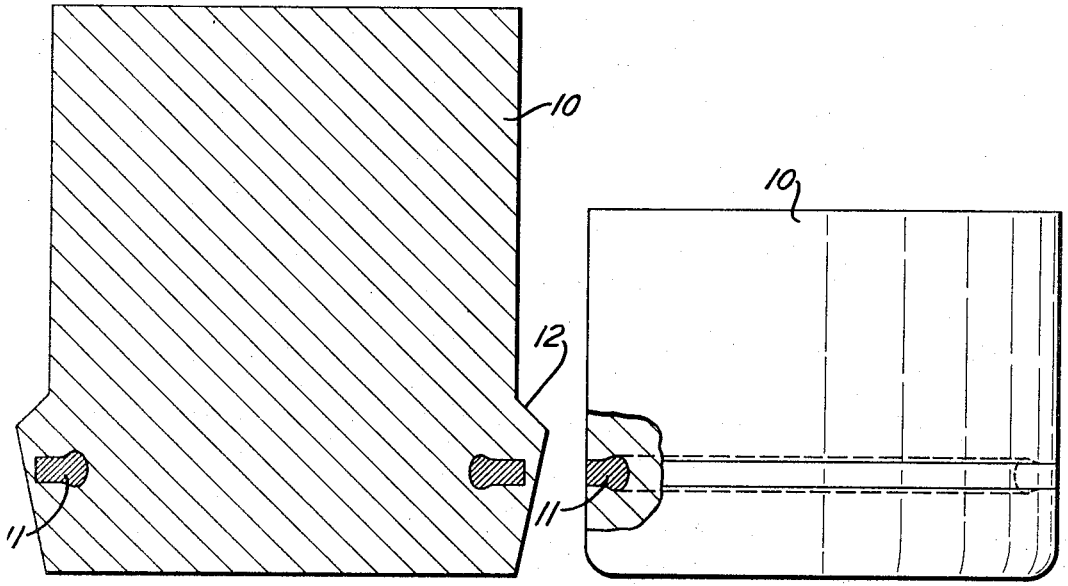
FIG. 1 is a vertical section through a cast blank for producing the piston.
FIG. 2 is a side elevation, partly in section, of the blank of FIG. 1 after machining and cutting to the proper length.

Referring to the drawings in greater detail, the body 10 is a solid cylindrical blank cast from an aluminum piston alloy, containing therein a ferrous insert band 11 metallurgically bonded to the aluminum. This structure may be produced in a manner known in the art, as by first dipping the band 11 in a bath of molten aluminum alloy, promptly placing it in a mold, and casting the body 10 around the band.

The cast aluminum may be the well-known Y-alloy, which has the following composition:

| | |
|---|---|
| Cu | 3.5–4.5 |
| Ni | 1.7–2.3 |
| Mg | 1.2–1.8 |
| Ti, max. | 0.20 |
| Zn, max. | 0.10 |
| Mn, max. | 0.10 |
| Fe, max. | 0.8 |
| Si, max. | 0.6 |
| Others: | |
| Max. each | 0.05 |
| Max. total | 0.15 |
| Al | Balance |

The band 11 may be of the well-known Ni-Resist cast iron, which has a thermal expansion coefficient linear expansion of $10.7 \times 10^{-6}/°$ F. over the temperature range 70–400° F.

It will be seen that in FIG. 1 there is an exterior frusto-conical projection 12 surrounding the band 11. This projection is provided solely for facilitating the formation of a good metallurgical bond between the band 11 and the aluminum. By providing this shape of cavity in the mold, the molten aluminum washes past the ferrous band, thus removing any aluminum oxide that may have formed on the molten aluminum coating on the band. Also, the presence of the aluminum body around the band during the period when the aluminum is shrinking as it cools from the casting temperature, helps to preserve the integrity of the bond.

After the casting shown in FIG. 1 has been produced, its outer surface is machined down and it is cut to the proper length for a blank to produce the size of piston desired. The outer diameter is machined away to expose the outer surface of band 11, as shown in FIG. 2. Subsequently, during machining of the piston, the groove for one of the sealing piston rings is machined into the band 11.

Figure 3:
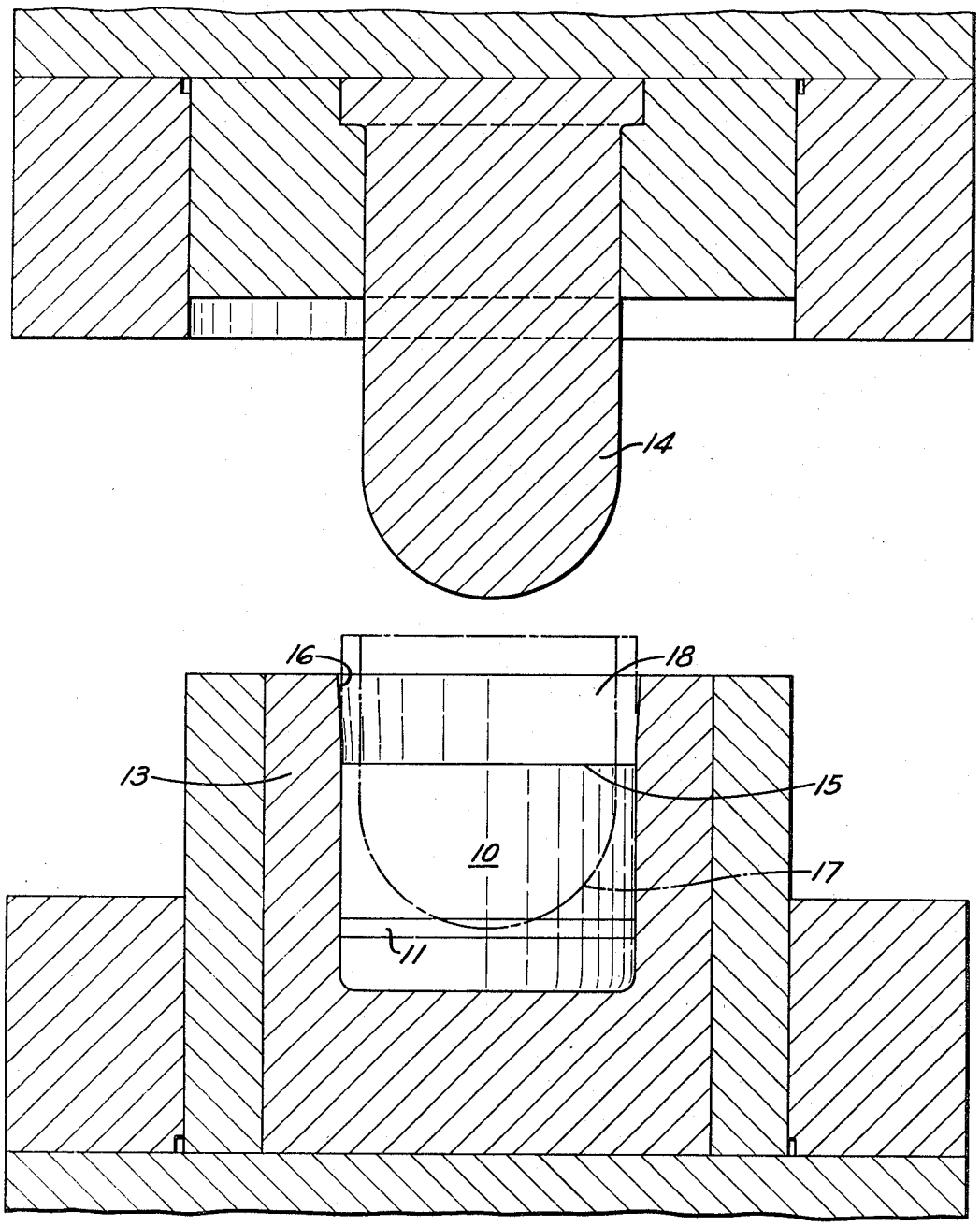
FIG. 3 is a vertical section through a forging die showing the die cavity and the shape of the piston after the blank has been struck by the punch.

In order to form the interior of the piston and give certain parts the characteristics of forged metal, the prepared blank of FIG. 2 is now subjected to a forging operation in the apparatus illustrated diagrammatically in FIG. 3.

The die 13 has an internal cavity corresponding with the shape desired for the outside of the semi-finished piston. The punch 14 is shaped to give the desired shape to the inside of the piston.

A special problem encountered in the process of the present invention is the fact that any disturbance of the cast metal around the band 11 will disrupt the metallurgical bond between the band 11 and the cast aluminum. It is important to preserve the integrity of this bond, and hence special steps are taken to avoid disruption of the bond.

It has been found that one step that helps to prevent disturbance of the cast structure around band 11 is to lubricate the upper part of the die wall. In carrying out this step, the entire inner surface of the die cavity above the line indicated at 15 is provided with a suitable lubricant. The presently preferred lubricant is white lead, although graphite, or any other suitable lubricant may be used.

The portion of the die below line 15 is left unlubricated so as to retard metal flow. The presence of the lubricant above line 15, as well as the outward flaring of the upper end of the die cavity as indicated at 16, facilitates metal flow above line 15.

After the die 13 has been properly lubricated, the blank 10 is placed in position in the die, and the punch 14 is caused to descend and to project into the blank as far as shown by the dot-dash line 17 in FIG. 3. The punch is then withdrawn and the partially forged blank is removed from the die.

Further finishing operations are performed, such as the boring of holes 18 for the wrist pins.

Figures 4, 5:
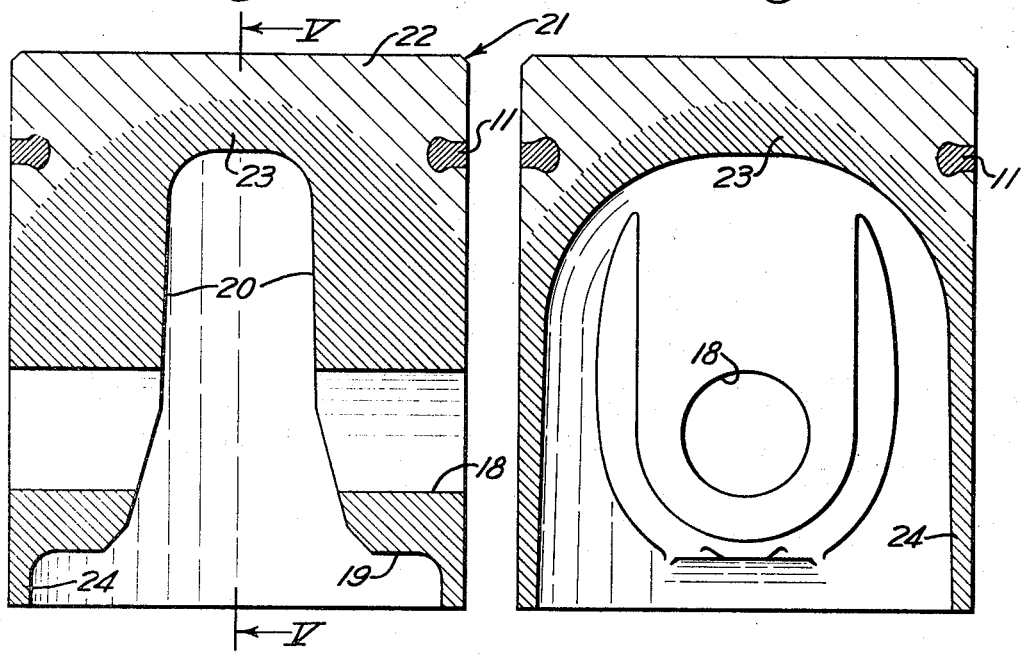
FIG. 4 is a vertical cross section through a piston of the invention.
FIG. 5 is a vertical cross section taken on line V—V of FIG. 4.

It will be clear from FIG. 4 that the punch 14 is given an appropriate contour to form the interior of the piston, including the wrist pin bosses 19, as well as any ribs which may be present between the head 21 and the bosses. The punch 14 can, of course, be given any desired shape within the limits of practicality, to form the interior of the piston.

In FIGS. 4 and 5 the semi-finished piston is shown head up, since that is its normal operating position. In describing the piston we will, therefore, refer to the piston in this normal operating position with the head at the top and the skirt below.

Referring then in greater detail to FIGS. 4 and 5, the cross-hatched areas represent cast metal while the double-hatched areas represent forged metal. It will be seen then that the semi-finished piston of FIGS. 4 and 5 has the following features:

A. The piston head 21 has an upper crown portion 22 which retains the characteristics of cast metal. This is due to the fact that the limited travel of the punch 14, and the other precautionary steps taken, have prevented any disturbance of the molecular structure during the forging operation.

(1) The ferrous ring-carrier 11 is surrounded by cast metal on all sides except its exposed outer wall, which will eventually receive the groove for a piston ring. Due to the fact that cast structure of this area has not been disturbed during the forging operation, there has been no impairment of the metallurgical bond between the carrier band 11 and the surrounding cast metal. The preservation of this bond is important in order to securely anchor the band 11 against the hammering of the piston ring in its groove during operation of the piston in an engine. The integrity of the bond is also important in order to provide for the best possible flow of heat from the top surface of the piston to the band 11, through the piston ring, and thence to the cooled cylinder wall.

B. The parts of the piston which have a forged structure provide a skeletal substructure which has the following parts:

(1) The dome-shaped substratum 23 which forms the lower part of the piston head.

(2) The piston pin bosses 19.

(3) The ribs 20 which extend downwardly from the dome-shaped substratum 23 and connect with the pin bosses 19.

(4) The tubular skirt 24, which is connected at its upper end to the periphery of the dome-shaped substructure 22.

This structure provides a number of advantages.

It will be seen that the unitary forged skeletal substructure forms a well-engineered structure to carry the various loads to which the piston is subjected.

The downward thrust of the exploding gases is received by the strong dome-shaped substratum 23, which transmits this force directly through the ribs 20 to the piston pin bosses 19. From the pin bosses this force is delivered to the wrist pin, and thence via the connecting rod to the crankshaft. Since the wrist pin bosses are an important load-bearing part of the piston, it is of especial advantage to have these parts included in the forged structure.

The vector of force which derives from the pressing of the skirt 24 against the cylinder wall is absorbed by the forged skirt.

Hence, it can be seen that all of the major force to which a piston is subjected are transmitted through strong, forged parts.

At the same time, the upper crown portion 22 of the head retains the characteristics of cast aluminum. Hence its upper surface is well adapted to resist cratering and burning as a result of its being subjected to the heat and flame of combustion.

While we have disclosed a particular form of piston, and one method of producing the piston, it should be understood that equivalents may be used within the scope of the invention. Thus, other alloys may be used for the piston, and the ring-carrier may be formed of other ferrous materials and may be of other shapes. Also, equivalent steps may be used in the process of manufacturing the piston.

In the following claims, reference characters identical with those used in the above specification have been inserted to facilitate identification of the elements claimed.

In the claims the term "aluminum" refers to those alloys of aluminum that are useful for pistons.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. The method of producing a composite cast-forged aluminum piston which comprises:
    (A) placing a suitably-prepared ring band in a mold in such a position that it will be located near the periphery of the piston head,
    (B) casting aluminum about the band so as to form a blank comprising a solid aluminum cylinder surrounding and metallurgically bonded to the ring band, the portion of the blank which contains the band being the head end, and the opposite end being the skirt end,
    (C) machining the cast blank to expose the outer surface of the ring band and to provide a blank of the desired length,
    (D) placing the machined blank in a die with the head end down, after lubricating the upper portion of the die cavity,
    (E) engaging the skirt end of the blank with a punch to form the inside of the piston and to produce a forged substructure including the piston skirt, pin bosses, boss supporting parts, and a substratum forming the lower part of the piston head,
    (F) limiting the travel of the punch to such an extent that cast structure is preserved in the top of the piston head and in the area surrounding the ring band.

2. A method as specified in claim 1 in which the ring band is formed of ferrous material.

References Cited by the Examiner

UNITED STATES PATENTS

| | | | |
|---|---|---|---|
| 2,620,530 | 12/1952 | Sulprizio | 29—156.5 X |
| 2,793,922 | 5/1957 | Whitfield | 29—156.5 X |
| 3,123,899 | 3/1964 | Townhill | 29—156.5 |

JOHN F. CAMPBELL, *Primary Examiner.*

P. M. COHEN, *Assistant Examiner.*